Oct. 25, 1949. J. M. MacLEAN Re. 23,161

RESILIENT WHEEL

Original Filed June 23, 1942 2 Sheets-Sheet 1

Inventor
JAMES M. MacLEAN
By: Fetherstonhaugh & Co.
Attys

Oct. 25, 1949. J. M. MacLEAN Re. 23,161

RESILIENT WHEEL

Original Filed June 23, 1942 2 Sheets-Sheet 2

Inventor
JAMES M. MacLEAN
By: Fetherstonhaugh & Co.
Att'ys

Reissued Oct. 25, 1949

Re. 23,161

UNITED STATES PATENT OFFICE 23,161

RESILIENT WHEEL

James Matthew MacLean, Windsor, Ontario, Canada

Original No. 2,450,672, dated October 5, 1948, Serial No. 448,122, June 23, 1942. Application for reissue April 14, 1949, Serial No. 87,551

5 Claims. (Cl. 152—41)

This invention relates to improvements in shock-absorbing connection between two or more relatively movable parts.

An object of the present invention is the provision of a resilient wheel for vehicles, such as automobiles, trucks, buses, street cars, railroad cars, and the like.

Another object is the provision of vehicle wheels having the resiliency of pneumatic tires without the use of such tires, by using rubber as the cushioning medium instead of air.

Another object is the provision of wheels of this type in which the deterioration of the rubber through friction is greatly reduced as compared to the wheels known in this art.

A further object is the provision of means in resilient wheels for eliminating excessive friction and particularly at points where lubrication is impossible.

This invention pertains to wheels of the type having spaced side members or plates formed with or connected to the hub of the wheel, and a web spaced from and projecting into the space between said members or plates, the rim or tire being formed with or mounted on the web beyond the edges of the members or plates. Shock-absorbing elements extending into alined circular recesses in the members and web form the connections therebetween and these elements tend to rotate as the wheel rotates. At first these elements deteriorated or sheared off owing to excess friction between the elements and the other parts. An attempt was made to overcome this difficulty by placing the ends of the element in cups which were free to rotate in the members and web. While an improvement, this raised another difficulty, the elements rotated too freely thus creating excessive friction between the cups and the other parts. As it was impossible to lubricate the cups in the webs, the wear was very great and a constant source of trouble.

These difficulties have been overcome by providing means enabling each element to rotate freely in one part and means for preventing excessive rotation thereof in the other part. In other words, the element swivels in one part. The braking action is preferably accomplished by permitting at least a portion of the element to engage the adjacent part. The element rolls or skips along the exposed part. If friction between the element and the part prevents the former from rotating, the resulting twisting action builds up a pressure until the element lets go or skips into its normal position. This prevents the pressure from building up until the element shears between the opposing parts. The element, which is preferably formed of rubber or rubber composition, does not rub against any large area of surface. This is important since rubber has a natural affinity for metal and tends to stick to it. Any rubbing between large areas of rubber and metal results in very great wear in both materials.

Figure 2:
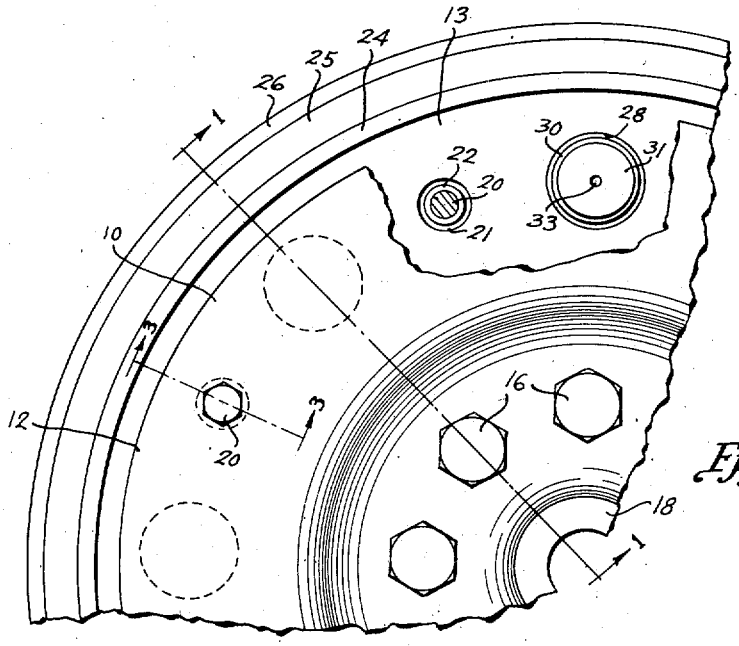
Figure 3:
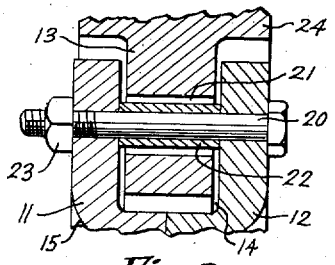
Figure 1:
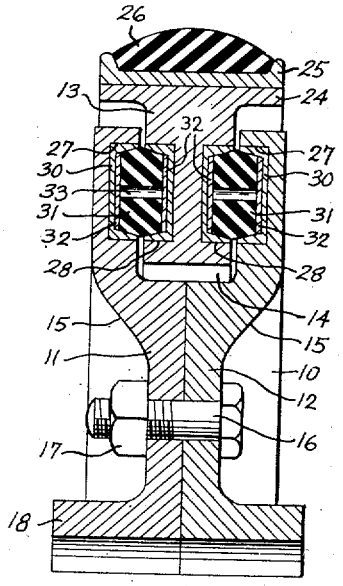
Figure 5:
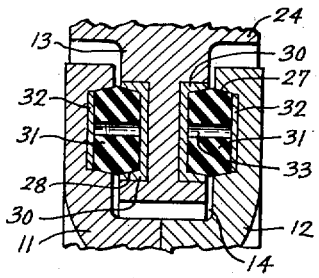
Figure 6:
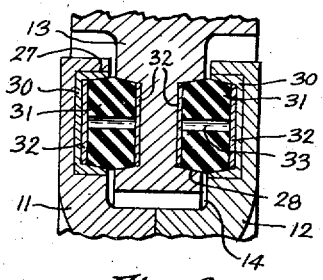
Figure 7:
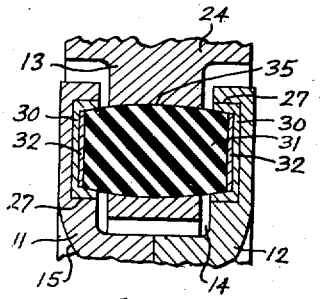
Figure 8:
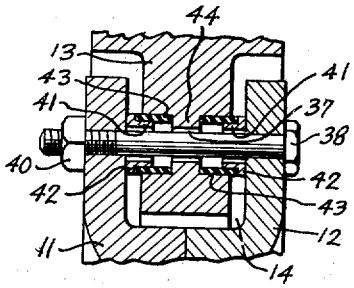
Figure 9:
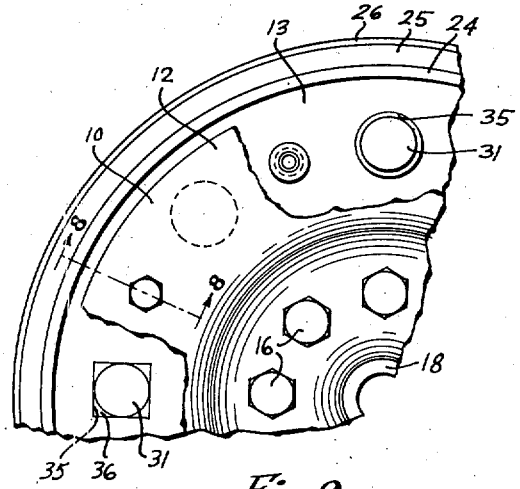
Figure 10:
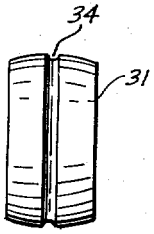

With the above and other objects in view, the present invention consists essentially of a resilient connection between two parts disposed and movable in substantially parallel planes and having circular recesses therein normally in axial alinement, comprising a shock-absorbing member having ends each extending into a separate recess, said member comprising an elastic element having at least a portion in contact with one of said parts, and means rotatably fitting between one end of the elastic element and the recess into which such end extends, as more fully described and illustrated by way of example in the following specification and the accompanying drawings, in which Figure 1 is a half section of a wheel taken substantially on the line 1—1 of Figure 2, illustrating one form of the invention, Figure 2 is a fragmentary side elevation of a wheel, Figure 3 is a fragmentary section taken substantially on the line 3—3 of Figure 2, illustrating a spacer, Figures 4 to 7 are fragmentary sections of wheels illustrating some variations of the invention, Figure 8 is a fragmentary section taken substantially on the line 8—8 of Figure 9, illustrating an alternative spacer, Figure 9 is a reduced fragmentary side elevation, partly in section, showing the variations of Figures 7 and 8, and Figure 10 is an enlarged elevation of an alternative shock-absorbing element.

Referring more particularly to the drawings, 10 may be a wheel for any type of vehicle, such as an automobile, bus, truck, street car, railroad car and the like, the one illustrated being a substitute for wheels ordinarily requiring pneumatic tires. This wheel may be of any desired construction, the illustrated example consisting of a pair of spaced side members or plates 11 and 12 and a web 13 projecting into the space 14 between the members or plates and spaced from the bottom. The members 11 and 12 which are substantially parallel to each other and to the web 13, are bent inwardly at 15 below the space 14 where they come together and are held in this position in any suitable manner, such as by bolts 16 and nuts 17. These members may be connected to a hub 18, or as shown, each member may be bent outwardly to form half of said hub.

The outer ends of the side members are held in their proper spaced positions in relation to the web 13 in any desired manner as long as these parts are permitted to move in substantially parallel planes. A plurality of spacers are provided adjacent the periphery of the members, one of which is illustrated in Figure 3. This spacer consists of a bolt 20 extending through the members and a relatively large recess 21 extending through the web 13. A sleeve 22 mounted on the bolt and spaced from the web, abuts against the inner faces of both members and a nut 23 draws the members firmly against the ends of the sleeve.

The web 13 is formed with a felloe 24 and a rim 25 is fitted on to said felloe. At tire 26 formed of any suitable material, preferably rubber or rubber composition, is mounted on the rim 25. This form of wheel may be used for automobiles, trucks, buses and the like, but for street and railroad cars, the felloe 24 would be formed with or have mounted thereon a rim or tread portion having the usual flange for engagement with a rail.

In the alternatives of Figures 1, 4, 5, and 6, each of the members 11 and 12 has a plurality of circular recesses 27 in its inner face in axial alinement with each other in pairs and with similar circular recesses 28 formed in the opposite faces of the web 13. The shock-absorbing arrangements are the same on both sides of each wheel.

In Figure 1, a cup 30 is rotatably mounted in each recess 27 and 28 at the bottom thereof. A substantially barrel-shaped shock-absorbing element 31 extends into both cups and bears against discs 32 freely positioned on the bottoms of the cups. The elements may or may not be bonded to the discs. These elements are more or less elastic or resilient and are preferably formed of rubber or rubber composition, although other suitable materials may be used, such as, for example, wood which may be used for heavy duty work where smooth riding is not of any particular importance. The elements formed of rubber or similar material have a channel formed therein to permit distortion thereof. In Figures 1, 4, 5, and 6, the element is provided with a central aperture 33, while in Figure 10 it has a peripheral channel 34 substantially midway between its ends.

When the wheel is under load, there is a tendency for the elements 31 to be distorted more or less into the form of a crank. As the wheel moves, stresses due to torque are added to the gravity stresses, but the torque stresses on each element change as the latter moves around the axle. At the top and bottom of the wheel the torque stresses are across the gravity stresses, on the down side of the wheel the gravity and torque stresses are substantially in the same direction, while on the up side these stresses oppose each other. In any case, the element tends to rotate within the parts as the wheel rotates. The discs and cups 30 permit this rotation. If the entire surface of both ends of a rubber element are disposed in contact with the adjacent cups, the latter rotate too freely causing excessive friction. This is undesirable since it is practically impossible to lubricate the cups within the web 13 without taking the wheel apart. Another disadvantage, is that the ends of the element tend to turn in relation to the cups, causing very great friction owing to the adhering qualities of the rubber, tending to rub away the rubber. The discs 32 greatly reduce these tendencies. In the first place, each end of the element bears against a disc instead of a cup, thus allowing relative movement between a disc, the adjacent part, and cup. As the cup and disc are smooth, the cup does not turn as fast as the disc. Secondly, the materials of these parts are smooth and do not stick or adhere to each other so that the friction is reduced and they are better able to stand the friction that does exist without excessive wear. If the discs are bonded to the element, there is no movement therebetween. The discs thus prevent the rubbing of any of the end surface of the element against the metal of members 11, 12, and 13, the portion of the periphery of the element exposed to the sides of the cups, rolls along the sides with very little friction, which, however, is sufficient to reduce the undesirable tendency to excessive rotation of the element with respect to the cups, discs, and recesses.

Figure 4:
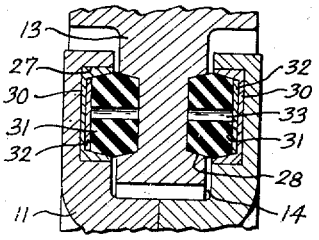

In Figure 4, a cup and disc have been provided for corresponding outer recesses, the opposite ends of the elements being free to roll in the recesses of the web. In this construction the disc prevents rubbing between one end of the element and the corresponding recess. At the opposite end of the element, the element is free to grip the sides and bottom of the recess, the cup and disc at the other end acting as a swivel permitting the element to turn freely in its recess without undue rubbing. In this way the element need not turn in the recess and in some instances it is preferable to bond the end of the element remote from the disc into the corresponding recess. For light service it is preferable not to bond the element to either part.

In Figure 5, the recesses of the web are provided with cups while those of the parallel parts each have a corresponding disc. In this construction, the elements are preferably bonded to the cups so that the braking effect is mainly caused by the engagement of peripheral portions of the elements with the recesses formed in the parallel parts.

In Figure 6 the cups have been omitted from the inner ends of the elements. In this case each element is preferably bonded to the discs 32. The function of the outer ends of these elements is the same as in Figure 1 but the discs on the inner ends of the elements function as a swivel. The element rolls along the walls of the recess to which it is exposed.

In the alternative of Fig. 7, the side members 11 and 12 are the same, but the web 13 is formed with a recess 35 which extends therethrough and is in axial alinement with the recesses of the side members. In this example, the shock-absorbing element 31 is longer than those described above. This element fits in the recess 35 and extends into the cups 30 of the recesses 27. The discs 32 may or may not be provided in the cups and the ends of the element are preferably bonded to the discs, if they are used, or to the bottoms of the cups. Furthermore, the element is preferably bonded in the recess 35 and this may be done by using a suitable bonding material, as at the top of Figure 9, on the centre portion 36 may be square in cross section, in which case the recess 35 would be of square section, as shown at the bottom of said figure.

The bonding of the element in the recess 35 or the friction of the element rolling over the surface of said recess, if it is not bonded, prevent the cups and discs from turning too rapidly. The bonding of the ends of the elements to the discs or cups, as the case may be, prevents any rubbing at these points. When discs are used, the portions of the element exposed to the walls of the cups roll along said walls. The element 31 of this alternative may be provided with an axial channel similar to the other elements or it may have a peripheral channel such as shown in Fig. 10, in the portions thereof extending between the faces of the web 13 and the adjacent side members.

If desired, the cups may be omitted from Figure 7, in which case the element is preferably bonded to the discs, and the action is the same as that with the variation shown in Figure 6.

Figure 8 illustrates an alternative spacer to that of Figure 3. The web 13 is formed with a recess 37 and a bolt 38 extends through the side members 11 and 12 and through the recess, said bolt being spaced from the recess. A nut 40 is threaded on to the end of the bolt. A collar 41 surrounds and is spaced from the bolt adjacent the inner face of each side member, and a flange 42 is formed on the outer end of each collar adapted to bear against the inner face of the adjacent member. A resilient sleeve 43, formed of rubber, rubber composition, or any other suitable material, is mounted on each collar 41 and extends inwardly from the flange 42 into the recess 37 of the web. Suitable means is provided for preventing the sleeves from moving laterally, such as for example, a shoulder 44 formed within the recess 37 substantially midway between the ends thereof. This shoulder is spaced from the bolt.

When the nut 40 is tightened, the side members 11 and 12 are resiliently retained in their proper spaced relationship. The construction of this spacer allows relative movement of the side members and the web in substantially parallel planes without permitting any part to lose its proper position in relation to the others.

The spacers of Figures 3 or 8 may be used with any forms of the invention. Figure 2 shows the positioning of the spacers of Figure 3 in relation to the shock-absorbing arrangements of Figures 1, 4, 5, and 6, while Figure 9 shows the spacers of Figure 8 with the alternative of Figure 7, but these may be interchanged.

While this invention has been described in connection with wheels, it is to be understood that it may be used for other purposes. For example, it may be used in a hanger connecting an automotive engine with its chassis frame. The vibrations tend to cause the shock-absorbing elements to turn and it is desirable that they should turn in order that all parts of the elements come into the lines of greatest stress, thus evenly distributing the wear. This invention reduces the wear caused by excessive friction as described above.

From the above, it will be seen that a resilient connection has been provided for two or more parts disposed and movable in substantially parallel planes, in which the shock-absorbing elements are permitted to turn without excess rotation or the rubbing of a substance with very definite adhering qualities against surfaces for which it has a natural affinity, such as rubber rubbing against metal.

Various modifications may be made in this invention without departing from the spirit thereof or the scope of the claims, and therefore, the exact forms shown are to be taken as illustrative only and not in a limiting sense, and it is desired that only such limitations shall be placed thereon as are disclosed in the prior art or are set forth in the accompanying claims.

What I claim as my invention is:

1. A resilient connection between two parts disposed and movable in substantially parallel planes and having circular recesses therein normally in axial alignment, comprising a cup rotatably mounted in one recess, a disc freely positioned on the bottom of the cup, and a shock-absorbing element extending into the recess of one part and into the cup against its disc within the recess of the other part.

2. A resilient connection between two parts disposed and movable in substantially parallel planes and having circular recesses therein normally in axial alignment, comprising a cup rotatably mounted in one recess, a disc freely positioned on the bottom of the cup, and a shock-absorbing element extending into the recess of one part and into the cup against its disc within the recess of the other part, said element being bonded in the recess of the one part.

3. A resilient connection between two parts disposed and movable in substantially parallel planes and having circular recesses therein normally in axial alignment, comprising a cup rotatably mounted in one recess, a disc freely positioned on the bottom of the cup, and a shock-absorbing element extending into the recess of one part and into the cup against its disc within the recess of the other part, said element being bonded to the disc within the cup.

4. A resilient connection between two parts disposed and movable in substantially parallel planes and having circular recesses therein normally in axial alignment, comprising a cup rotatably mounted in one recess, discs freely positioned on the bottoms of the cup and of the opposite recess, and a shock-absorbing element extending into the recess of one part and into the cup within the recess of the other part against the respective discs.

5. A resilient connection between two parts disposed and movable in substantially parallel planes and having circular recesses therein normally in axial alignment, comprising a cup rotatably mounted in one recess, discs freely positioned on the bottoms of the cup and of the opposite recess, and a shock-absorbing element extending into the recess of one part and into the cup within the recess of the other part against the respective discs, said element being bonded to the discs.

JAMES MATTHEW MacLEAN.

No references cited.